United States Patent
Allouis et al.

(10) Patent No.: US 10,651,550 B2
(45) Date of Patent: *May 12, 2020

(54) RADOME

(71) Applicant: HELLA GMBH & CO. KGAA, Lippstadt (DE)

(72) Inventors: David Allouis, Bad Iburg (DE); Wolfgang Nicke, Lörrach (DE); Heiko Schöne, Zell im Wiesental (DE); Herbert Wambsganss, Schopfheim (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 125 days.

This patent is subject to a terminal disclaimer.

(21) Appl. No.: 15/767,434

(22) PCT Filed: Sep. 23, 2016

(86) PCT No.: PCT/EP2016/072632
§ 371 (c)(1),
(2) Date: Apr. 11, 2018

(87) PCT Pub. No.: WO2017/067736
PCT Pub. Date: Apr. 27, 2017

(65) Prior Publication Data
US 2018/0294560 A1    Oct. 11, 2018

(30) Foreign Application Priority Data

Oct. 19, 2015 (DE) .......... 10 2015 220 341

(51) Int. Cl.
*H01Q 1/42* (2006.01)
*H01Q 1/32* (2006.01)
(Continued)

(52) U.S. Cl.
CPC ............ *H01Q 1/42* (2013.01); *B60R 13/005* (2013.01); *G01S 7/032* (2013.01); *G02B 6/0065* (2013.01);
(Continued)

(58) Field of Classification Search
CPC ...... H01Q 1/42; H01Q 1/3233; H01Q 1/3283; H01Q 1/426; G01S 7/032;
(Continued)

(56) References Cited

U.S. PATENT DOCUMENTS 6,184,842 B1 * 2/2001 Leinweber ............. B29C 45/16
156/60
6,335,699 B1 * 1/2002 Honma .................... H01Q 1/42
342/13

(Continued)

FOREIGN PATENT DOCUMENTS

DE        198 19 709 A1     11/1999
DE    20 2012 002 178 U1     4/2012
(Continued)

OTHER PUBLICATIONS

International Search Report, PCT/EP2016/072632, dated Dec. 19, 2016, 3 pgs.

(Continued)

*Primary Examiner* — Ab Salam Alkassim, Jr.
(74) *Attorney, Agent, or Firm* — Paul D. Strain, Esq.; Strain & Strain PLLC

(57) ABSTRACT

The invention relates to a radome comprising a substantially sheet-type front plate the front face of which is transparent and the rear face of which is provided with an opaque layer, at least one cut-out being provided in the opaque layer and acting as a light passage; a reflective region of the sheet-type front plate, said reflective region being arranged adjacently to the cut-out; at least one substantially sheet-type light (Continued)

guide situated on the rear face of the opaque layer; and at least one light-emitting element which is coupled to the light guide such that light enters said light guide, propagates through the at least one light guide, is reflected on the reflective region, and enters the transparent front plate at said at least one light passage such that the light is emitted from the front face of the front plate.

21 Claims, 6 Drawing Sheets

(51) Int. Cl.
*B60R 13/00* (2006.01)
*G01S 7/03* (2006.01)
*G09F 13/12* (2006.01)
*F21V 8/00* (2006.01)
*G01S 13/931* (2020.01)

(52) U.S. Cl.
CPC ........... *G09F 13/12* (2013.01); *H01Q 1/3233* (2013.01); *H01Q 1/3283* (2013.01); *G01S 2013/93271* (2020.01)

(58) Field of Classification Search
CPC ........... G01S 2013/9375; G02B 6/0065; G09F 13/12; B60R 13/005
See application file for complete search history.

(56) References Cited

U.S. PATENT DOCUMENTS

| | | | |
|---|---|---|---|
| 9,937,896 B2* | 4/2018 | Walzik | B60R 25/2009 |
| 10,005,387 B2* | 6/2018 | Co | B60Q 1/2611 |
| 10,279,736 B2* | 5/2019 | Schneider | B60Q 3/60 |
| 10,529,262 B2* | 1/2020 | Schone | G09F 21/04 |
| 2008/0122708 A1 | 5/2008 | Lindackers et al. | |
| 2015/0280316 A1* | 10/2015 | Iso | H01Q 1/06 343/713 |
| 2017/0101047 A1* | 4/2017 | Dellock | B60Q 1/2603 |
| 2017/0222311 A1* | 8/2017 | Hess | H01Q 1/42 |
| 2017/0227187 A1* | 8/2017 | Fritz | B60Q 1/2665 |
| 2017/0357044 A1* | 12/2017 | Kuramitsu | B60Q 1/50 |
| 2018/0022274 A1* | 1/2018 | Kincade | B60R 13/005 362/23.09 |
| 2018/0112847 A1* | 4/2018 | Childress | F21S 41/24 |
| 2018/0215086 A1* | 8/2018 | Geise | B29C 45/14336 |
| 2018/0299532 A1* | 10/2018 | Allouis | H01Q 1/3233 |
| 2018/0301797 A1* | 10/2018 | Allouis | H01Q 1/3233 |
| 2018/0340673 A1* | 11/2018 | Herrmann | B60Q 1/2607 |
| 2018/0351242 A1* | 12/2018 | Wambsganss | H01Q 1/3233 |
| 2019/0031118 A1* | 1/2019 | Sanahuja Clot | C23C 14/20 |
| 2019/0100159 A1* | 4/2019 | Schone | G09F 13/12 |
| 2019/0103042 A1* | 4/2019 | Schone | G09F 13/18 |
| 2019/0143909 A1* | 5/2019 | Mayer Pujadas | B60R 13/005 |
| 2019/0299880 A1* | 10/2019 | Caruso | B60S 1/54 |
| 2019/0305411 A1* | 10/2019 | Mayer Pujadas | H01Q 1/3233 |
| 2019/0356046 A1* | 11/2019 | Mayer Pujadas | H01Q 1/422 |

FOREIGN PATENT DOCUMENTS

| | | |
|---|---|---|
| DE | 10 2013 016 667 A1 | 7/2014 |
| DE | 10 2015 004 204 A1 | 8/2015 |
| DE | 20 2015 102 310 U1 | 8/2015 |
| EP | 0 954 052 A2 | 11/1999 |
| EP | 2 208 645 A1 | 7/2010 |
| JP | 4790095 B1 | 10/2011 |
| JP | 2014-70899 A | 4/2014 |

OTHER PUBLICATIONS

German Search Report, Appl. No. 10 2015 220 341.7, dated May 24, 2016, 8 pgs.
Allouis, U.S. PTO Notice of Allowance, U.S. Appl. No. 15/767,448, dated Sep. 5, 2019, 9 pgs.
Allouis, U.S. PTO Office Action, U.S. Appl. No. 15/767,448, dated Jun. 21, 2019, 10 pgs.
Terminal Disclaimer over U.S. Appl. No. 15/779,111 submitted to the USPTO in U.S. Appl. No. 15/767,448 on Aug. 19, 2019.
International Search Report, PCT/EP2016/072658, dated Dec. 19, 2016, 3 pgs.
International Search Report, PCT/EP2016/072643, dated Dec. 19, 2016, 3 pgs.
German Search Report, Appl. No. 10 2015 220 346.8, dated May 24, 2016, 7 pgs.
German Search Report, Appl. No. 10 2015 220 343.3, dated May 24, 2016, 8 pgs.

* cited by examiner

RADOME

CROSS-REFERENCE TO RELATED PATENT APPLICATIONS

This application is a National Stage of International Application No. PCT/EP2016/072632, filed Sep. 23, 2016, which is based upon and claims the benefit of priority from prior German Patent Application No. 10 2015 220 341.7, filed Oct. 19, 2015, the entire contents of all of which are incorporated herein by reference in their entirety.

TECHNICAL FIELD

The invention relates to a radome, in particular for a radar sensor for a motor vehicle.

PRIOR ART

Radomes are covering elements or covering plates that cover a radar transmitter or radar sensor which emits radar waves. These radomes are used in motor vehicles to protect such radar transmitters, for example of radar distance warning systems arranged in the vehicle front, from the influence of weather and from damage, such as falling rocks or precipitation, wherein the radome must at the same time also satisfy visual requirements of the vehicle manufacturer, because it is integrated in the vehicle front and helps define the appearance of the vehicle. Radomes of this type have become known for example from DE 198 19 709 A1.

In a radome, it is furthermore essential that it is at least substantially transparent for electromagnetic radiation in the longwave wavelength range, wherein it is advantageous that it is at least regionally opaque in the optically visible wavelength range. This transparency is achieved by way of coatings or lacquers, such that materials which are transparent in the optically visible wavelength range are opaquely covered and thus become non-transparent. As a result, visible three-dimensional structures can be produced, which can also be used as brand symbols, for example.

Inserted to this end is a radome having a front plate which has a front surface on its front side and a rear-side surface on its rear side. The front side can here be formed by a transparent material which can be coated and covered from the rear side so that optically visible structures can be produced.

Such visible structures, however, are not always easily detectable in particular in the dark or in poor visibility.

REPRESENTATION OF THE INVENTION, OBJECT, SOLUTION, ADVANTAGES

It is the object of the invention to provide a radome which is easy to manufacture and yet exhibits a defined optical effect, in particular also in the dark and in poor visibility.

The object is achieved by way of the features of claim 1.

An exemplary embodiment of the invention relates to a radome having a substantially extensive front plate, which is configured to be transmissive on the front side and which is provided on the rear side with a layer that does not transmit light, wherein at least one cutout in the form of a light passage is formed in the layer that does not transmit light, having a reflective region of the extensive front plate, wherein the reflective region is arranged next to the cutout, having at least one substantially extensive light guide which is arranged on the rear side at the layer that does not transmit light, and having at least one light-emitting element which is coupled to the light guide such that light enters the light guide and such that the light propagates through at least one light guide and enters the transmissive front plate at the at least one light passage and is reflected at the reflective region such that it exits the front plate on the front side. As a result, a defined light passage of the light on the front side can be achieved, with the result that a defined illumination is observable if observed from the front. If the cutouts are arranged in a geometric pattern, said pattern is easily detectable upon illumination from the rear in particular at night if observed from the front.

According to the invention, it is advantageous if at least one diffuser element is arranged at the at least one light guide, which diffuser element is arranged such that the light propagating through the at least one light guide enters the diffuser element, propagates through the diffuser element, and exits the diffuser element and enters the transmissive front plate at the at least one light passage and is reflected at the reflective region such that it exits the front plate on the front side.

In an exemplary embodiment of the invention, it is advantageous if an extensive light guide or a plurality of extensive light guides is or are provided, wherein assigned to each light guide is at least one light-emitting element, preferably more than one light-emitting element, which is coupled to the light guide for feeding light into the light guide. As a result, it is possible by way of the light guide to guide light in a targeted fashion from the light-emitting element into the region of the cutout, such that the optical effect is easily detectable. It is particularly advantageous here if the cutout has a for example linear extent, such that light is detectable along the linear cutout on the front side of the radome.

It is also advantageous if at least one diffuser element is assigned to at least one of the light guides or each of the light guides. As a result, the light is guided more intensely in the region of the cutout into the front plate because the light is scattered in a targeted fashion in the diffuser, in particular also in the direction of the cutout.

It is particularly advantageous here if the diffuser element is arranged at an outer periphery of the light guide and in particular rests against it. The light can then enter the diffuser through the substantially extensive light guide at its outer periphery and from there be scattered in the direction of the transparent front plate. As a result, uniform lighting of the cutout or illumination through the cutout can be effected.

It is also advantageous if the diffuser element engages around the perimetric outer periphery of the light guide. As a result, perimetric largely uniform lighting or illumination can be produced. It is possible in this way to effectively represent extensive figurative motifs.

It is particularly advantageous if the reflective region of the front plate is a reflectively coated region of the surface of the front plate or a boundary face of the surface of the front plate. As a result, a reflective region can be produced at the surface of the front plate, which reflective region serves for the reflection of light such that the light can exit laterally from the light guide or diffuser element and is forwardly reflected at the reflective region in the direction of the front side of the front plate.

It is also advantageous here if the reflective region is formed as a boundary face, as a lacquered boundary face or as a mirror-coated boundary face.

It is also advantageous here if the reflectively coated region is coated with a metallic coating. It is hereby possible to achieve permanently good reflection.

It is also furthermore advantageous if the reflective region of the front plate is a beveled or conical region which is arranged at a defined angle, in particular between 30° and 60°, with respect to the plane that is at least substantially defined by the front plate. It is thus possible to reflect the light in a targeted fashion in the direction of the front surface of the front plate.

It is also advantageous if the angle is in particular between 40° and 50°, in particular is 45°. In this way, a relatively direct reflection to the front is achieved.

It is furthermore expedient if the reflective region of the front plate is a curved region which is inclined in particular relative to the plane which is at least substantially defined by the front plate.

It is also expedient if the light guide is made of a transparent plastics material and the diffuser element is made of a translucent plastics material. As a result, the light is efficiently transferred from the light-emitting means to the diffuser element and is scattered there such that it can be guided uniformly into the cutout.

For example, it is advantageous in an exemplary embodiment if the light guide and the diffuser element are placed to be next to one another in the form of separately configured parts. It is hereby possible to easily produce the two parts separately and to arrange them next to one another or inside one another.

It is also expedient if the light guide and the diffuser element are arranged as interconnected parts in neighboring fashion, for example are interconnected in particular by way of injection molding or adhesive bonding. It is thus possible in a two-component method to easily and without complication produce the entire part consisting at least of the light guide and the diffuser element, which also simplifies installation.

It is furthermore expedient if a rear-side cover is provided which covers the light guides and any diffuser elements arranged on the rear side of the front plate. Consequently, the radome is also protected from behind, where the electrical connections are advantageously arranged.

Further advantageous configurations are described by the following description of the figures and by the dependent claims.

BRIEF DESCRIPTION OF THE DRAWINGS

The invention will be explained in more detail below on the basis of at least one exemplary embodiment with reference to the drawings, in which.

PREFERRED EMBODIMENT OF THE INVENTION

Figure 1:
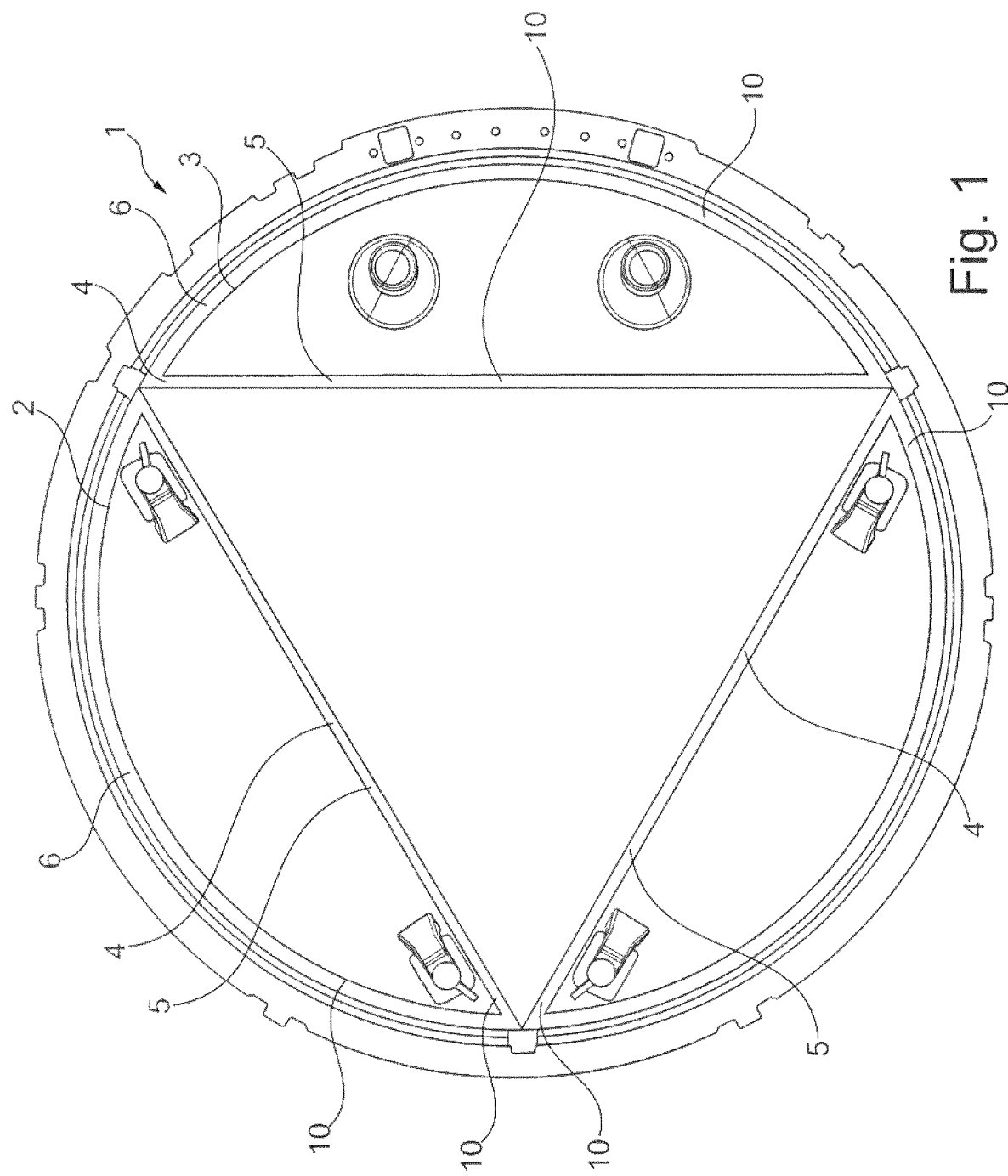
FIG. 1 shows a schematic view of a radome from the front side.

FIG. 1 shows a radome 1 from a front side 2. The radome 1 here has a substantially extensive front plate 2, whose front side is configured to be transmissive and whose rear side is provided with a layer 3 that does not transmit light, see also FIG. 6. At least one cutout 4 in the form of a light passage 10 is formed here in the layer 3 that does not transmit light.

The cutout 4 that is in the form of a light passage 10 is configured in FIG. 1 in the manner of a triangle made from three straight bars 5 of the cutout 4, which has an annular border 6. The bars 5 can here also have an angled design, such as for example centrally angled. At least one substantially extensive light guide 7 is arranged on the rear side of the front plate 2 of the radome 1.

Figure 2:
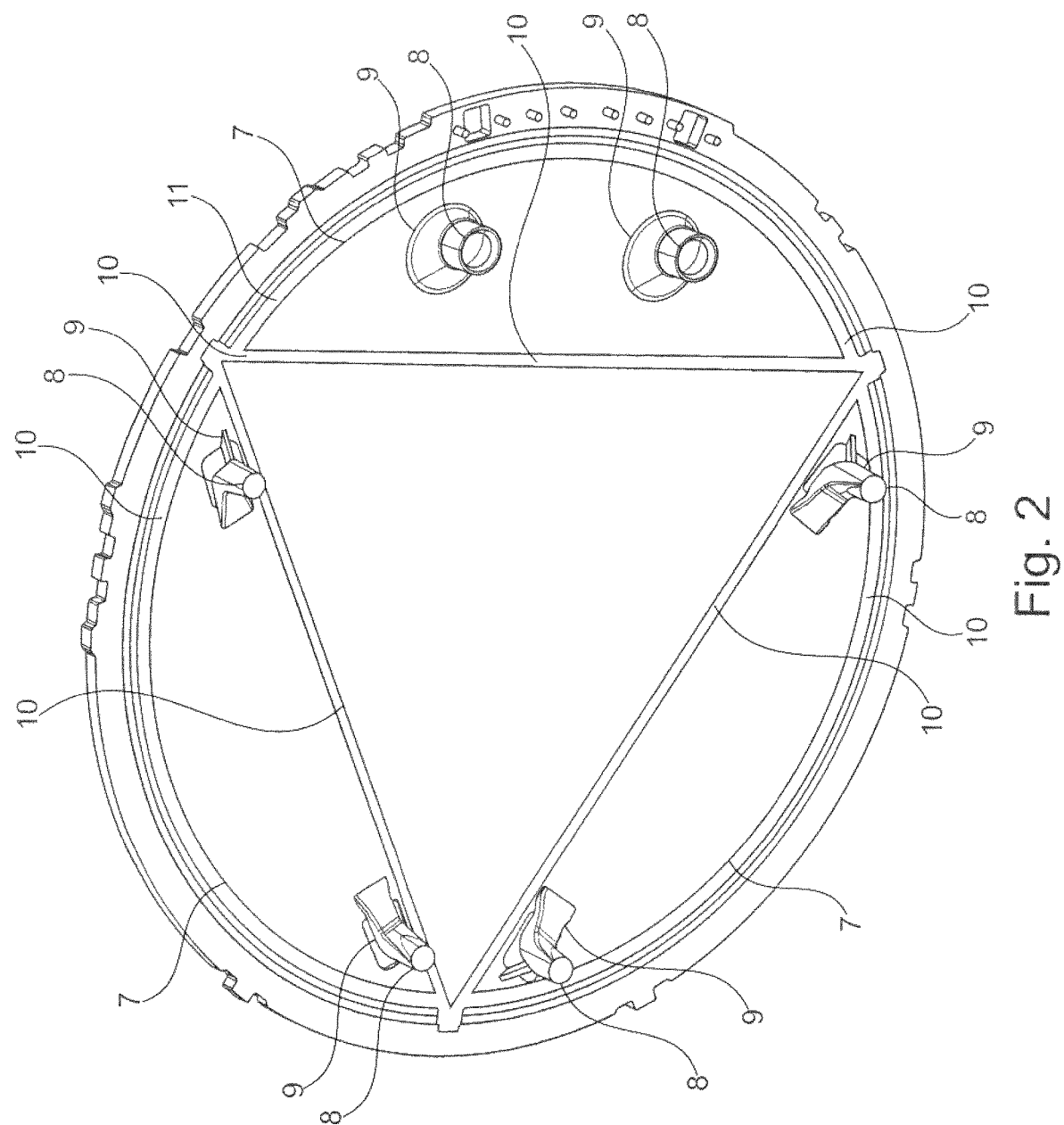
FIG. 2 shows a schematic view of a radome from the rear side.

FIG. 2 shows that in this exemplary embodiment, three extensive light guides 7 are arranged, which are arranged on the rear side at the layer 3 that does not transmit light. In other exemplary embodiments, other configurations with a different number of light guides 7 can be provided.

Preferably provided per light guide 7 is furthermore at least one light-emitting element 8, which is coupled to an input coupling element 9 of the light guide 7 to couple light into substantially extensive light guide 7. The respective light-emitting element 8 is coupled to the respective light guide 7 such that light enters the light guide 7 at the input coupling element 9 and that the light propagates through the at least one light guide 7, is reflected at a reflective region of the front plate 2, and enters the transmissive front plate 2 at the at least one light passage 10 such that it exits the front plate 2 on the front side and the illumination effect becomes visible.

It can be seen here that at least one diffuser element 11 is arranged optionally at the at least one light guide 7, which diffuser element 11 is arranged such that the light propagating through the at least one light guide 7 enters the diffuser element 11, propagates through the diffuser element 11 and exits the diffuser element 11 again and is reflected at the reflective region of the front plate 2 and enters the transmissive front plate 2 at the at least one light passage 10 such that it exits the front plate 2 on the front side and the illumination effect becomes visible.

Figure 3:
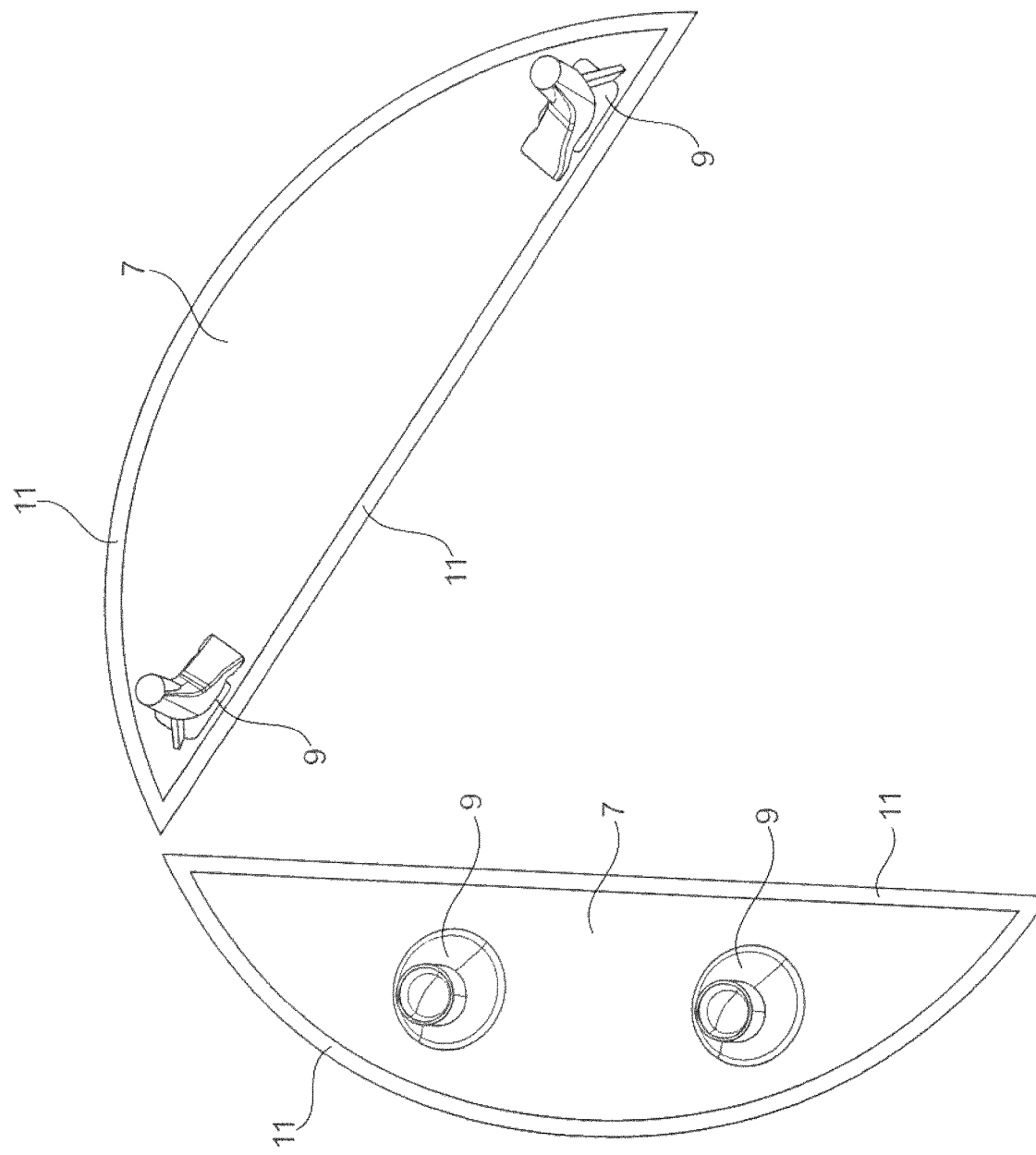
FIG. 3 shows two light guides having diffuser elements that surround them in each case.

FIG. 3 shows two extensive light guides 7, which are configured approximately like segments of a circle, which can in particular be configured to be flat or curved. Such extensive light guides 7 can be provided individually, or a plurality of such extensive light guides can be provided. In the example of FIGS. 1 and 2, three such light guides 7 are provided. At least one light-emitting element 8 is assigned here to each of the light guides 7, wherein with preference also more than one light-emitting element 8, such as two light-emitting elements 8, can be assigned, which can be placed on the input coupling elements 9 such that the light-emitting elements 8 are coupled to the light guide 7 for feeding light into the light guide 7. The input coupling elements 9 are here of quite different configuration, as is shown in FIG. 3. They are preferably arranged per light guide 7 at a distance from one another.

In accordance with an exemplary embodiment, at least one diffuser element 11 is assigned to at least one of the light guides 7 or advantageously to each of the light guides 7.

Figure 4:
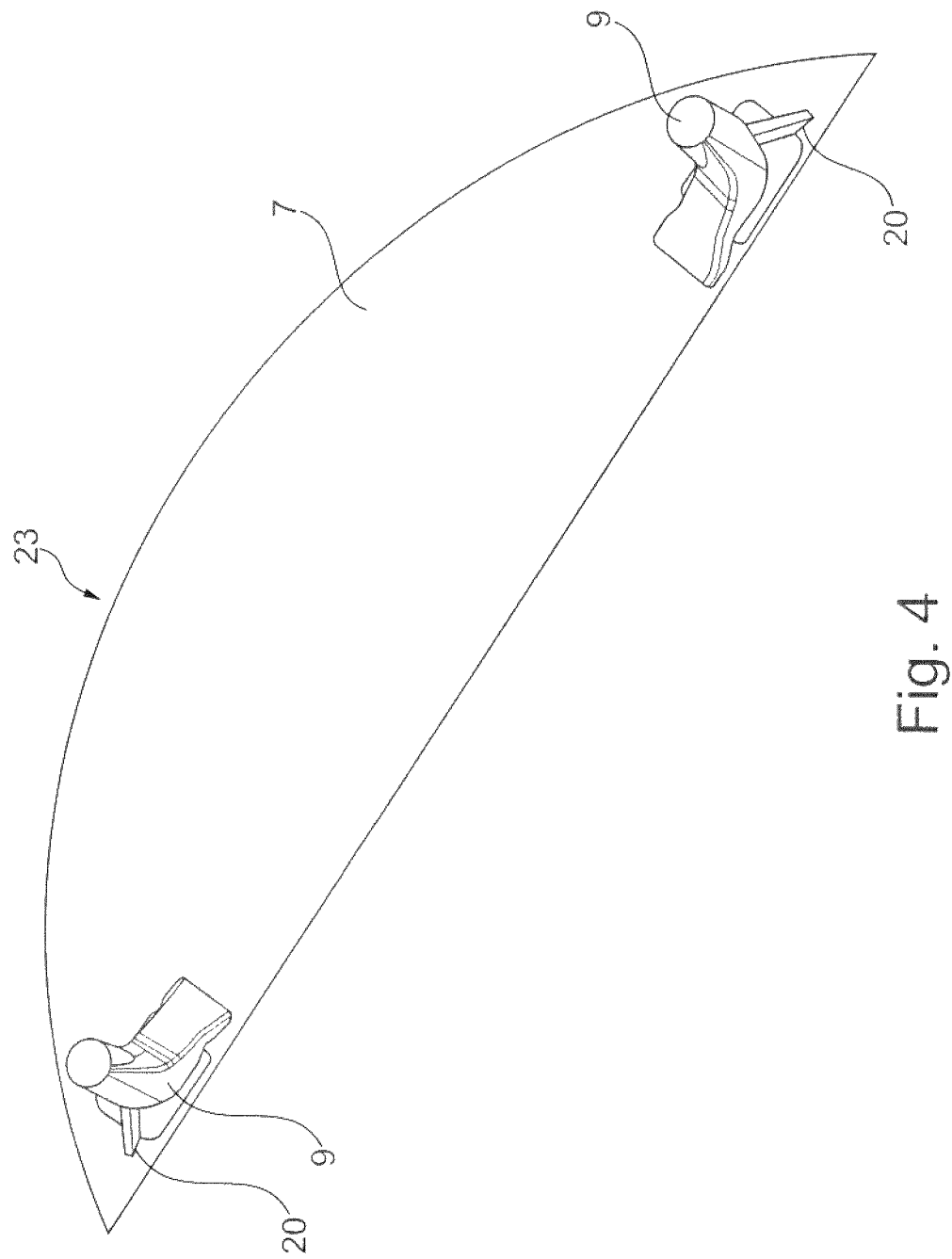
FIG. 4 shows a light guide.
Figure 5:
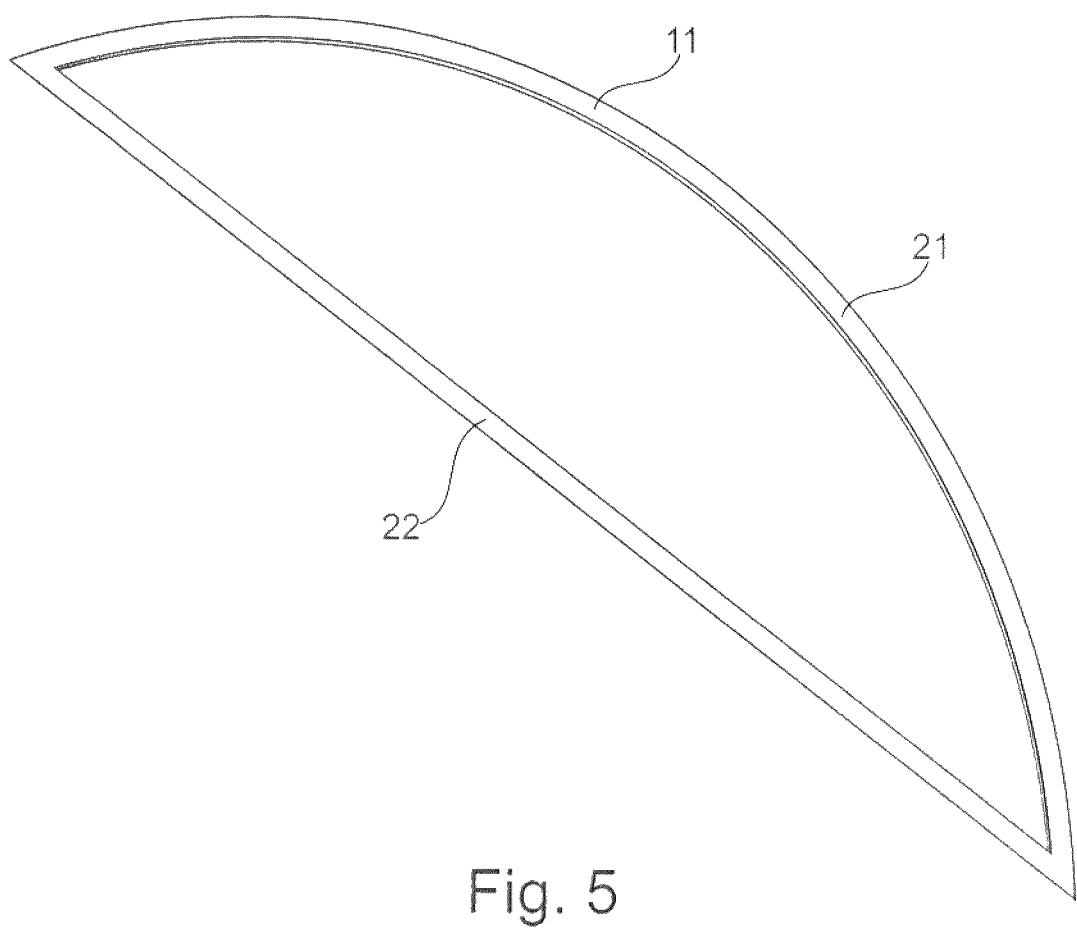
FIG. 5 shows a diffuser element.

FIG. 4 shows an exemplary light guide 7, which is configured approximately in the manner of a segment of a circle and has input coupling elements 9 which are arranged at the converging end regions 20 at a distance from one another. A diffuser element 11 having an approximately arcuate part 21 and an approximately straight part 22 is assigned to said extensive light guide 7, wherein the diffuser element 11 is arranged at an outer periphery 23 of the light guide 7 and in particular rests against it. This is also shown in FIG. 3. The approximately arcuate part 21 here can be, for example, a piece of a circle or be curved in a manner that deviates therefrom. The approximately straight part 22 can be straight or have an angle, such as in particular have an angle at the center and form a flat V, for example.

It is particularly advantageous here if the diffuser element 11 engages around the perimetric outer periphery 23 of the light guide 7. Alternatively, the diffuser element 11 can also merely rest against a side or only partially against the outer periphery 23 of the light guide. It is also possible for a plurality of diffuser elements 11 to be assigned to the light guide 7, which regionally rest against or abut the light guide 7.

Figure 6:
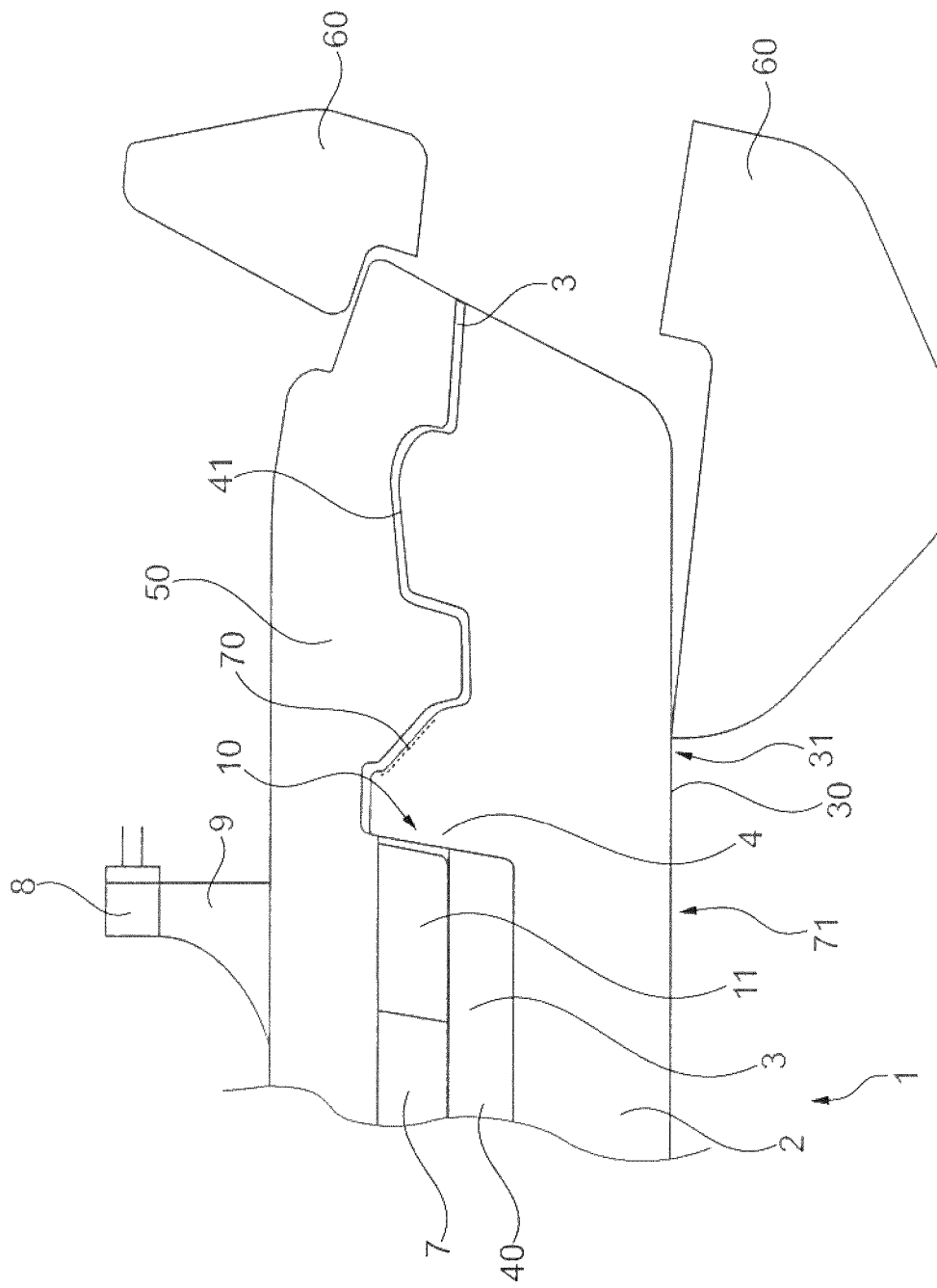
FIG. 6 shows a view of the radome in a partial section.

FIG. 6 shows a section through the radome 1, wherein only a radially outwardly located partial region thereof can be seen. The radome 1 has a front plate 2 made of a transparent material. This material can here in particular be a plastics material. The front plate 2 can also furthermore optionally be coated on its front side 30 with at least one coating 31 so as to have a scratch-resistant configuration. The extensive front plate 2 is transmissive, for example transparent.

Provided on the rear side of the front plate 2 is a layer 3 that does not transmit light and is at least partly or regionally sprayed on and/or lacquered or injection-molded on or adhesively bonded thereto. For example, regions can be provided with a sprayed-on plastics layer 40, wherein the transparent material of the front plate can also be injection-molded onto the layer that does not transmit light. Radially outwardly, a lacquered surface 41 which is configured such that it does not transmit light can be seen. At least one cutout 4 in the form of a light passage 10 is also formed in the layer 3 that does not transmit light, such as between the regions 40 and 41 in FIG. 6. Configured and arranged next to the cutout 4 is furthermore a reflective region 70, with the result that light from the light guide 7 or from the diffuser element can be reflected at the reflective region and is reflected in the direction of the front side of the front plate. The reflective region 70 of the front plate 2 is preferably a reflectively coated region of the surface of the front plate 2. The reflectively coated region 70 can be coated here with a metallic coating so as to obtain a permanently good reflective property.

FIG. 6 shows the configuration of the reflective region 70 of the front plate 2 in the form of a conical region which is arranged at a defined angle, in particular between 30° and 60°, with respect to the plane 71 which is at least substantially defined by the front plate 2. The angle is preferably in particular between 40° and 50°, in particular 45°.

It is also advantageous if the reflective region 70 of the front plate 2 is alternatively configured as a curved region which is tilted in particular relative to the plane 71 which is at least substantially defined by the front plate 2.

Arranged on the rear side of the front plate 2 of the radome 1 is, on the rear side of the layer 3 that does not transmit light, a substantially extensive light guide 7. Arranged next to the light guide and also in the region of the light passage 10 is optionally a diffuser element 11. The light is emitted by a light-emitting element 8, input into an input coupling element 9 and input into the light guide 7. From here, the light is fed into the diffuser element 11 and from here scattered to the reflective region 70, reflected here and then reflected through the light passage 10 to the front of the front plate 2. Here, the light exits on the front side and can thus represent a defined light structure. On the rear side, a cover 50 can be provided, which covers the front plate 2 with the light guide 7 and optional diffuser element 11.

The light guide 7 is preferably made of a transparent plastics material and the optional diffuser element 11 is preferably made of a translucent plastics material.

With respect to the manufacturing of the light guide and of the diffuser element, they can be produced as separately configured parts and be placed in neighboring fashion at the rear side of the front plate 2. Alternatively, the light guide and the diffuser element can be formed as interconnected parts next to one another, which are produced together in particular by injection molding or are adhesively bonded together.

A termination element 60 can be provided on the peripheral side of the front plate, which termination element 60 is configured for example as a covering ring to cover an emission of light of the radially outer contour of the radome.

LIST OF REFERENCE SYMBOLS 1 radome
2 front plate
3 layer that does not transmit light
4 cutout
5 straight bars
6 annular border
7 light guide
8 light-emitting element
9 input coupling element
10 light passage
11 diffuser element
20 converging end regions
21 arcuate part
22 straight part
23 outer periphery
30 front side
31 coating
40 plastics layer
41 lacquered surface
50 cover
60 termination element
70 reflective region
71 plane

The invention claimed is:

1. A radome comprising a substantially extensive front plate, which is configured to be transmissive on a front side and which is provided on a rear side with a layer that does not transmit light, wherein a cutout in the form of a light passage is formed in the layer that does not transmit light, a reflective region of the front plate, wherein the reflective region of the front plate is arranged next to the cutout, a substantially extensive light guide which is arranged on the rear side at the layer that does not transmit light, and a light-emitting element which is coupled to the light guide to permit light to enter the light guide, wherein the light guide is configured such that the light propagates through the light guide and enters the front plate at the light passage and is reflected at the reflective region of the front plate such that it exits the front plate on the front side.

2. The radome as claimed in claim 1, wherein a diffuser element is arranged at the light guide, which diffuser element is arranged such that the light propagating through the light guide enters the diffuser element, propagates through the diffuser element, exits the diffuser element, enters the front plate at the light passage, and is reflected at the reflective region of the front plate, such that it exits the front plate on the front side.

3. The radome as claimed in claim 1, wherein the extensive light guide comprises a plurality of extensive light guides, wherein assigned to each light guide is at least one light-emitting element coupled to the light guide and configured to feed light into the light guide.

4. The radome as claimed in claim 2,
wherein the diffuser element is assigned to the light guide.

5. The radome as claimed in claim 4,
wherein the diffuser element is arranged at an outer periphery of the light guide.

6. The radome as claimed in claim 4,
wherein the diffuser element engages around a perimetric outer periphery of the light guide.

7. The radome as claimed in claim 1,
wherein the reflective region of the front plate is a reflectively coated region of the surface of the front plate or a boundary face of the surface of the front plate.

8. The radome as claimed in claim 7,
wherein the reflectively coated region is coated with a metallic coating.

9. The radome as claimed in claim 1,
wherein the reflective region of the front plate is configured as a boundary face, a lacquered boundary face, or a mirror-coated boundary face.

10. The radome as claimed in claim 1,
wherein the reflective region of the front plate is a beveled or conical region which is arranged at a defined angle with respect to the plane that is at least substantially defined by the front plate.

11. The radome as claimed in claim 10, wherein the defined angle is between 40° and 50°.

12. The radome as claimed in claim 1,
wherein the reflective region of the front plate is a curved region, which is inclined relative to a plane which is at least substantially defined by the front plate.

13. The radome as claimed in claim 2,
wherein the light guide comprises a transparent plastics material and the diffuser element comprises translucent plastics material.

14. The radome as claimed in claim 2,
wherein the light guide and the diffuser element are arranged next to one another in the form of separately configured parts.

15. The radome as claimed in claim 2,
wherein the light guide and the diffuser element are arranged as interconnected parts in neighboring fashion.

16. The radome as claimed in claim 2,
further comprising a rear-side cover which covers the light guide and the diffuser element arranged on the rear side of the front plate.

17. The radome as claimed in claim 3,
wherein assigned to each light guide is more than one light-emitting element.

18. The radome as claimed in claim 5,
wherein the diffuser element rests against the light guide.

19. The radome as claimed in claim 10,
wherein the defined angle is between 30° and 60°.

20. The radome as claimed in claim 10, wherein the defined angle is 45°.

21. The radome as claimed in claim 15,
wherein the light guide and the diffuser are interconnected by way of injection molding or adhesive bonding.

* * * * *